United States Patent [19]

Herman

[11] Patent Number: 5,146,758

[45] Date of Patent: Sep. 15, 1992

[54] PROCESS OF PRODUCING SOFT ELASTIC GELATIN CAPSULES

[76] Inventor: Norman L. Herman, 6905 Hwy. 81, N., Piedmont, S.C. 29673

[21] Appl. No.: 663,567

[22] Filed: Mar. 4, 1991

[51] Int. Cl.$^5$ .......................................... F25D 25/00
[52] U.S. Cl. ............................................ 62/62; 15/4; 62/381; 134/25.1; 134/40; 264/43
[58] Field of Search .................. 15/3, 4, 90, 97.1; 62/62; 134/25.1, 40; 427/3; 425/804; 264/20, 340, 4.3

[56] References Cited

U.S. PATENT DOCUMENTS

| | | | |
|---|---|---|---|
| 458,571 | 9/1891 | Gedge | 15/3.16 |
| 961,936 | 6/1910 | Colton et al. | |
| 1,628,333 | 5/1927 | Schaub | 53/440 |
| 2,349,430 | 5/1944 | Hiatt et al. | 424/451 |
| 2,387,747 | 10/1945 | Cowley | 18/21 |
| 2,449,139 | 9/1948 | Power | 18/5 |
| 3,137,630 | 6/1964 | Hecker et al. | 264/14 |
| 3,576,759 | 4/1971 | Powell et al. | 264/4.3 |
| 3,592,945 | 7/1971 | Engelking | 424/463 |
| 3,656,997 | 4/1972 | Cordes | 424/463 |
| 3,797,272 | 3/1974 | Huey | 62/381 |
| 4,028,024 | 6/1977 | Moreland | 425/133.1 |
| 4,670,287 | 6/1987 | Tsuji | 424/463 |
| 4,816,259 | 3/1989 | Matthews et al. | 424/463 |
| 4,978,483 | 12/1990 | Redding, Jr. | 425/804 |
| 5,017,383 | 5/1991 | Ozawa et al. | 427/3 |

OTHER PUBLICATIONS

1L. Lachman, H. Lieberman, & J. Kanig, *The Theory and Practice of Industrial Pharmacy* (3d ed. 1986), pp. 406–408.

Primary Examiner—Ronald C. Capossela
Attorney, Agent, or Firm—Bailey & Hardaway

[57] ABSTRACT

A safe and non-toxic process is provided for treating hot, newly formed soft elastic gelatin capsules to avoid their sticking to one another and to remove matter in the form of oils, pastes, and solid particles from exterior surfaces of the capsules, comprising the steps of: 1) cooling the capsules to aid in preventing capsule deformation and to aid in removing aqueous moisture from exterior surfaces of the capsules, and 2) contacting the capsules with an absorbent material to remove the matter from the exterior surfaces of the capsules. Alternatively, for certain type capsules, the process of the present invention may comprise the single step of absorption of matter from the exterior surfaces of the capsules.

32 Claims, 6 Drawing Sheets

PROCESS OF PRODUCING SOFT ELASTIC GELATIN CAPSULES

BACKGROUND OF THE INVENTION

The present invention relates to soft elastic gelatin capsules and a method for producing such capsules which are free from surface oils or other unwanted material used in processing while providing for non-sticking of the capsules after formation Such unwanted material may consist of liquid chemicals and solvents, such as naphtha and perchloroethylene, which are often used by manufacturers to remove processing oils and fluids but which are thought may be subject to environmental and health

BACKGROUND ART

The field of the invention is generally referred to as Soft Elastic Gelatin Capsule Manufacturing, and the following references show the state of the art:

U.S. PATENTS

| Number    | Name            | Date           |
|-----------|-----------------|----------------|
| 961,936   | Colton et al.   | June 21, 1910  |
| 1,628,333 | Schaub          | May 10, 1927   |
| 2,349,430 | Hiatt et al.    | May 23, 1944   |
| 2,387,747 | Cowley          | Oct. 30, 1945  |
| 2,449,139 | Power           | Sept. 14, 1948 |
| 3,592,945 | Engelking       | July 13, 1971  |
| 3,656,997 | Cordes          | April 18, 1972 |
| 4,028,024 | Moreland        | June 7, 1977   |
| 4,670,287 | Tsuji           | June 2, 1987   |
| 4,816,259 | Matthews et al. | March 28, 1989 |

PUBLICATION

L. Lachman, H. Lieberman & J. Kanig, The Theory and Practice of Industrial Pharmacy (3d ed. 1986) [hereinafter Industrial Pharmacy].

In soft elastic gelatin capsule technology, the media used for the casing of the capsule contains substances such as gelatin, water, glycerin, sorbitol, lecithin, pigments and starch. These substances are components which impart an elastic sheath around the drug, cosmetic, nutritional or other materials desired to be encapsulated. Due to the elastic, sticky nature of the casing, very often capsules tend to adhere, attach, or stick together after they are just formed because of the characteristics of the gelatin-glycerine component mixture comprising the casing. These sticking properties have become the norm in manufacturing operations.

Some methods of overcoming this sticking tendency contemplate using oils (ex., mineral), which promote sealing of the capsules and aid in preventing sticking. The capsules are thereafter subjected to a solvent wash cycle. The wash cycle is an essential step of the soft elastic gelatin encapsulation process since it removes the oils. The capsules are then kept moving in a rotating pan, basket, or conveyance device while being exposed to warm air to remove the solvents from the capsules. Such methods to remove oils possess inherent disadvantages.

First, the aforementioned rotating devices occupy a significant amount of operating space. Specifically, as many as ten separate, successive rotating baskets have customarily be used to remove the solvent remaining on the capsules from an initial wash cycle. Moreover, the conventional process moves the capsules to a second solvent washer after rotation in the tenth basket; the capsules are thereafter successively transferred to three additional rotating baskets to remove the solvent from the second wash cycle. Not only does such a process of treating newly-formed capsules occupy a large space, but it also demands considerable time, typically three to four hours.

Second, such wash cycles typically include the use of toxic organic liquids such as Perchloroethylene, Naphtha, Naphthalene, Toluene, Hexane, etc. For instance, *Industrial Pharmacy, supra,* at 407 teaches the use of a "Naphtha wash unit" to remove mineral oil from newly-manufactured capsules, and U.S. Pat. No. 1,628,333 teaches the washing of completed capsules in a "suitable solvent" to cleanse them of the oil into which they were previously immersed to prevent sticking. The organic liquid flushes the oils from the soft elastic gelatin capsule surface and acts to harden the capsule sheath or wall. The use of these liquids, however, poses potential environmental and health concerns.

Recent developments in soft elastic gelatin capsule technology include gelatin-mass bloom strength technology, which controls the ultimate degree of hardness of the soft elastic gelatin capsule, as disclosed in U.S. Pat. No. 4,816,259; ingredient additions, such as a plasticizer as disclosed in U.S. Pat. No. 2,349,430, or selective rationing of ingredients to increase physical and chemical compatibilities of the capsule fill material with the outside sheath or shell. However, as with the other attempts to perfect soft elastic gelatin capsules, the problem of removing the undesirable features of oil and matter from the capsule surface still remains.

Among other developments in the art is the cooling of newly-extruded capsules. For example, U.S. Pat. No. 4,028,024 teaches cooling of capsules during conveyance thereof from an extruder head through the use of cool air blown through a foraminous conveyor belt. It is also taught, however, that when mineral oil is used in the manufacture of gelatin capsules, the finished capsules must be subsequently washed of such oil. In general, none of the presently available processes are universally thought to provide for a clean, safe, environmentally sound production of soft elastic gelatin capsules.

In addition to all the other problems, the manufacturing of a soft elastic gelatin capsule at a manufacturer's plant frequently requires rewashing of soft elastic gelatin capsules after inspection for leakage for purpose of further removal of oils (ex., mineral, fish, vitamin E, soybean, etc.).

Thus, the industry has long sought a process which could be utilized after the formation of a soft elastic gelatin capsule which would provide the various desirable factors non-sticking, sheen, no oil surface, product elegance, safe operational handling, environmentally safe operation and non-reactivity—while providing a handsome cost savings to the manufacturer, who currently must purchase expensive organic solvents and deal with potential OSHA and DHEC violations and personal illness due to solvent toxicity. Liability regulatory risks would be diminished with removal of solvent by a method which is recognized to be safe. The operators and handlers would then be free of the encumbrance of dealing with organic materials, and the health risks to the consumer due to this factor would be eliminated. Reduction in the required operating area is also highly desirable.

Accordingly, it is an important object of the invention to provide a process of producing soft elastic gelatin capsules that will eliminate the need to use organic solvents for the removal of oils from the surfaces of such capsules.

Another important object of the invention is to provide a process of producing soft elastic gelatin capsules that will eliminate the need to subject such capsules to excessive rotation before undergoing surface oil removal, thereby reducing operating space requirements Another important object of the invention is to provide a process of producing soft elastic gelatin capsules that will utilize physical removal of surface oils and other matter from such capsules or a combination of such physical removal and temperature reduction of the capsules in varying, optimal ratios to achieve production of non-sticking, oil-free soft elastic gelatin capsules within the shortest possible time period.

SUMMARY OF THE INVENTION

This invention relates to a process for treating hot, newly-formed soft elastic gelatin capsules to prevent their sticking to one another and to remove matter in the form of oils, manufacturing vehicles, and solid particles from the exterior surfaces of the capsules by the steps of: 1) cooling the capsules to aid in preventing capsule deformation and to aid in removing aqueous moisture from the exterior surfaces of the capsules, and 2) contacting the capsules with an absorbent material to remove such matter from the exterior surfaces of the capsules. Alternatively, for certain type capsules, the process of the present invention may comprise the single step of absorption of matter from the exterior surfaces of the capsules.

In another aspect, this invention relates to non-sticking, oil-free soft elastic gelatin capsules made by the foregoing process.

Capsules may be produced for internal or external use and may range from being a drug, nutritional supplement, cosmetic, or the capsule may act as a dosage form or device for the administration of pharmaceuticals, medicines, cosmetics, nutrients, drugs, pesticides or poisons. They may be inert, containing no contents at all for gelatin supplement purposes, or be filled with potent liquids, solids or gases. This invention can be utilized for each type.

A preferred embodiment of this process contemplates cooling capsules using cathebar air (air having low humidity) in conjunction with suitable lint-free modified polyester cloths. The capsules, after being formed, pass into a pneumatic transport conveyer and are thereby deposited into successive rotating baskets wherein they undergo indirect heat exchange with cool cathebar air so that the capsule shell temperature is reduced adequately to prevent capsules from sticking to one another. The capsules simultaneously commingle with the modified polyester cloths in the rotating baskets to physically remove surface oils.

The process of the invention is useful with capsules of all shapes, sizes and configurations. Capsule sizes which can be applied to the above technology include but are not limited to #1, #2, #3, #4, #5, #6, #7, #8, #9, #10, #11, #12, #13, #14, #15, #16, #17, #18, #19, #20, #21, #22, #23. Capsules smaller or larger than those mentioned along with various shapes, configurations and applications should be considered to be within the scope of this invention.

The process of the present invention will eliminate the need for the toxic solvents and chemicals historically utilized in the preparation of soft elastic gelatin capsules, including but not limited to: Perchloroethylene, Naphthalene, Hexane, Dichloroethane, other hydrocarbons and halogenated solvents, and acetone. Hence, the scope of this invention will include elimination of all hazardous chemicals known to the industry in the procedure of manufacturing soft elastic gelatin capsules. As such, environmental pollution, human toxicity due to contact, and exposure with the chemicals will be eliminated. Processing plant liability would thereby diminish as it relates to the user of toxic chemicals in soft elastic gelatin capsule manufacturing operations. In addition, other anti-adherent materials, such as oils used as a physical aid to prevent sticking, can also be serviced by the process of this invention.

BRIEF DESCRIPTION OF THE DRAWINGS

The invention will be more readily understood from a reading of the following specification and by reference to the accompanying drawings forming a part thereof, wherein an example of the invention is shown and wherein.

DESCRIPTION OF PREFERRED EMBODIMENTS

Figure 1:
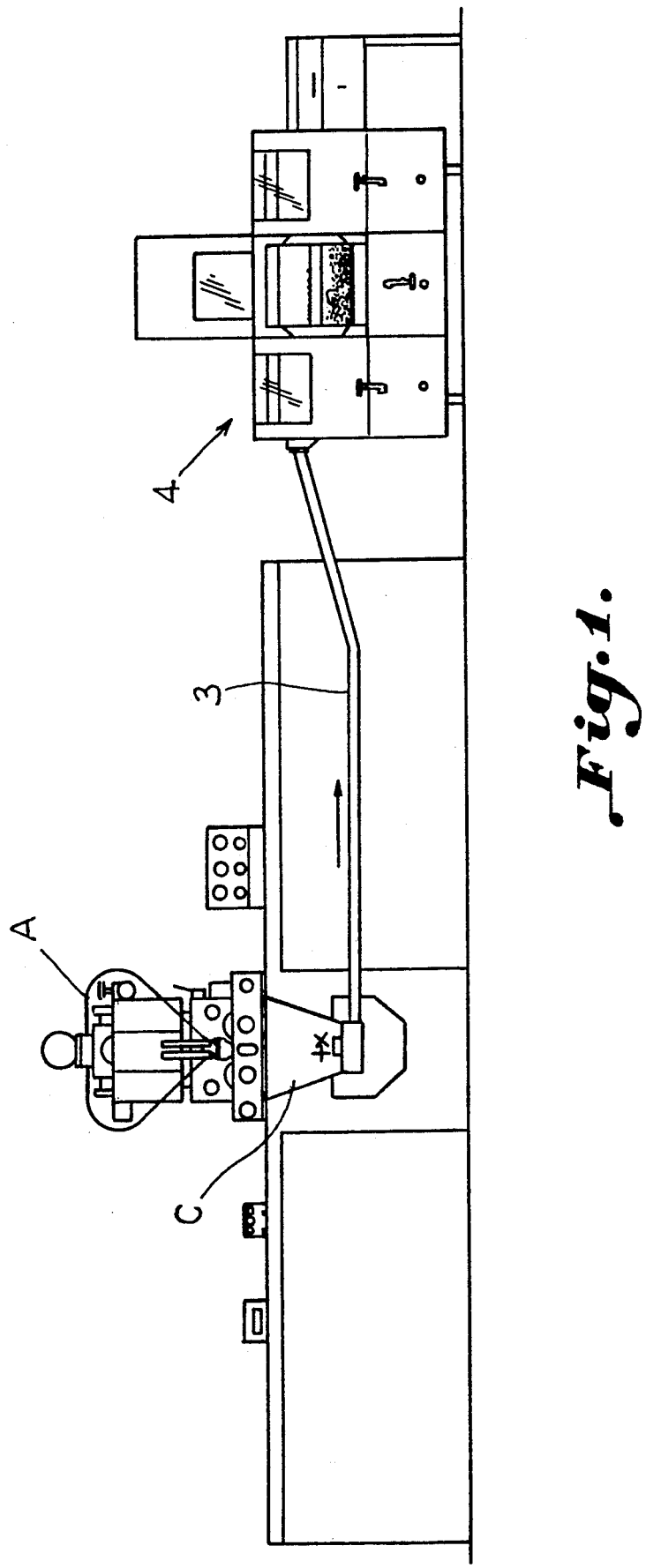
FIG. 1 is a schematic view illustrating a manufacturing line to treat newly-formed capsules in accordance with a preferred embodiment of the process of the present invention.

In accordance with the present invention, it has unexpectedly been discovered that, by combining the cooling of soft elastic gelatin capsules after formation with the physical removal of outside oils and material therefrom, soft elastic gelatin capsules can be produced as free flowing, non-sticking entities without the use of solvents. The soft elastic gelatin capsules are cooled by the use of a refrigeration instrument in conjunction with an oil absorbent material in ratios which will vary depending on ingredients, capsule size, and composition. The degree of cooling and volume of oil absorbent material therefore vary with the product being manufactured. Moreover, different types of cooling and various physical materials for oil removal can be employed; for instance, small amounts of cooling and minimal fiber material can be instrumental in production of elegant soft elastic gelatin capsules.

Soft elastic gelatin capsule cooling and physical removal of oils and matter are combined in particular amounts depending upon the product and product nature. The ranges of cooling and material required for physical oil removal are: 1) for capsule cooling, sufficient cooling to reduce the intial capsule temperature of 70°-95° F. (21.1°-35.0° C.) to 35°-45° F. (1.7°-7.2° C.)., a 2) for physical removal of oil, between one small swatch of fiber to massive amounts of cloth material. The oil absorbency will be dependent upon the quantity of oil to be picked up and the presence of other external materials such as powders. Additionally, the volume of cloth material will be determined by the number of capsules and the sizes thereof. Such cloth may be re-used.

Capsule cooling helps to prevent capsule deformation, helps to remove aqueous moisture from the capsule shell, and allows for non-sticking of the capsules prior to de-oiling. The range of cooling temperature depends upon the machinery and orientation of the soft elastic gelatin capsule apparatus. Input temperature (the temperature of the capsules prior to cooling) may vary depending upon whether the cooling is to be applied directly or indirectly on the capsules or gelatin. Typical gelatin capsule fill content temperature is 60° F. (15.6° C.) to 95° F. (35.0° C.). Cooling of the capsule may require a temperature drop of as little as 1° F. (17.2° C.), or as much as 100° F. (37.8° C.), although these extremes are not the recommended magnitudes for most kinds of capsules.

Cooling of the capsules should be applied at a rate which is in accord with the thermal heat transfer rate of the individual capsule. As capsules are produced in various shapes and sizes ranging from very small to quite large, the degree of heat transfer across the capsule wall will vary, thus requiring a lower or higher level of cooling to prevent sticking prior to de-oiling. The temperature of capsule contents will significantly influence the designated cooling temperature. Some capsule contents ar heated prior to manufacturing to facilitate filling and proper sealing of the capsule. Those capsules, being necessarily warm, require a higher rate of cooling than those capsules whose contents are not pre-warmed. Another factor which will play a role in the degree of cooling is gelatin ribbon thickness. Those capsules having a ribbon thickness which is greater than others will require a higher rate of cooling. Exceptions to the above are possible.

Cooling can be achieved in various ways. Refrigeration by the use of mechanical or electronic devices, forced air, or outside cool or cold air blown onto the system directly or indirectly can achieve the desired results. A refrigeration unit in the configuration of a blower, conveyor, or box unit can also achieve the cooling results. Water-cooled conveyance units or jacketed machinery may also bring about the desired results of cooling the capsules. Any other physical or chemical (non-toxic) cooling technique which brings about the successful cooling of soft elastic gelatin capsules can be thought of as being within the scope of this invention.

Figure 2:
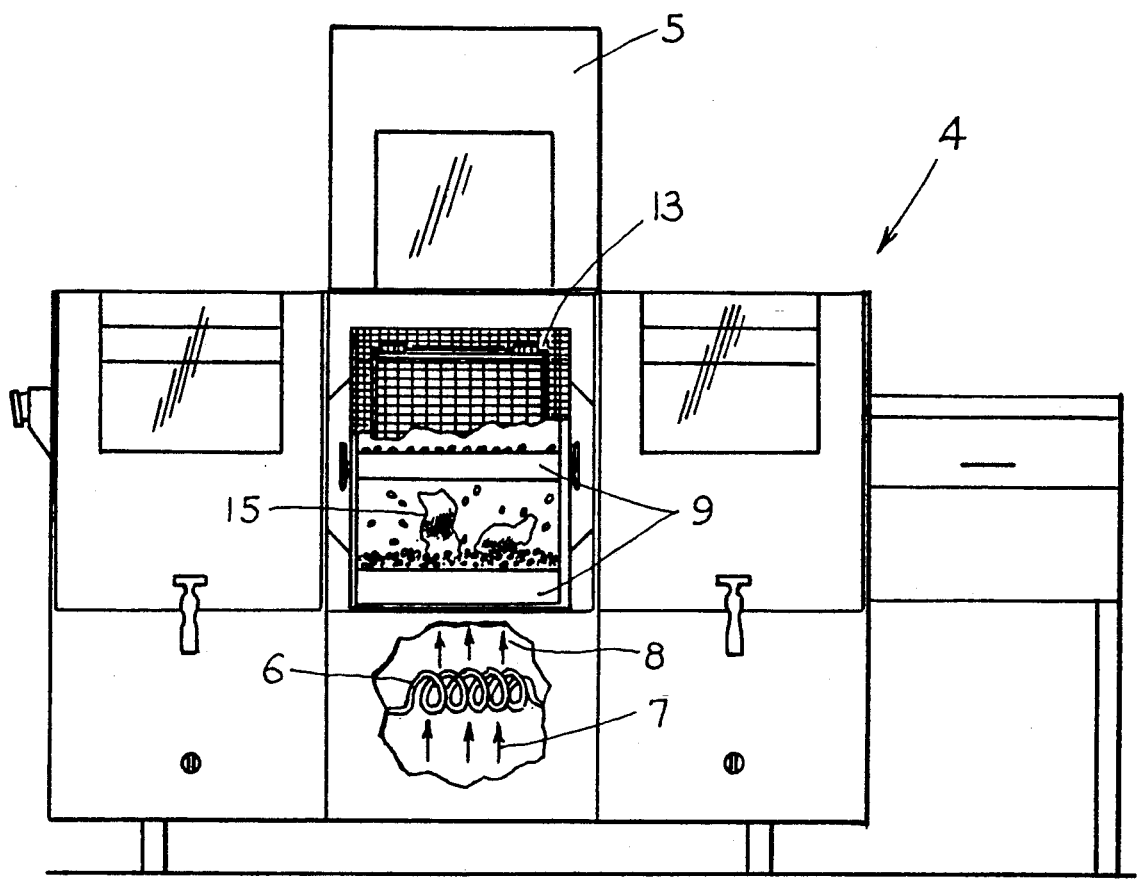
FIG. 2 is a partial enlargement of FIG. 1, illustrating the preferred cooling means and the rotating tumbling means of the preferred embodiment of the process of the present invention.

The preferred method of cooling contemplates the use of cathebar air to foster direct heat exchange with the capsules to cool them. Such air additionally drives off any surface moisture due to condensation. FIG. 1 illustrates a manufacturing line generally comprising an extruder head A, a cup C, a suitable pneumatic conveyor 3, and a rotating tumbling means 4. After capsules are formed by the extruder head A, they drop into cup C, whereupon they are transported by the pneumatic conveyor 3 to the rotating tumbling means 4. Referring to FIG. 2, the rotating tumbling means 4 is illustrated as being a series of rotating baskets 13, each basket housed in a suitable cabinet 5 and containing at least one absorbent cloth 15, such as modified polyester, for intermingling with capsules 10. Each basket 13 is provided with a plurality of baffles 9 to encourage tumbling of the capsules. Cathebar air having a relative humidity of approximately 20% enters the cabinets from the rear of same (not shown). The breakaway section reveals a cooling coil 6 with incoming cathebar air at 65°-70° F. (18.3-21.1° C.) indicated by arrows 7, flowing therethrough. The resulting cathebar air, indicated by arrows 8, has been cooled to 45°-50° F. (7.2°-10.0° C.) by coil 6 and passes through the underside of basket 13. Basket 13 has a plurality of holes therein (not shown) to permit passage of the cool cathebar air 8 into its interior, thereby allowing direct heat exchange with the capsules 10. This heat exchange reduces the capsule input temperature by 30°-40° F. over a time of one to sixty minutes.

Figure 3:
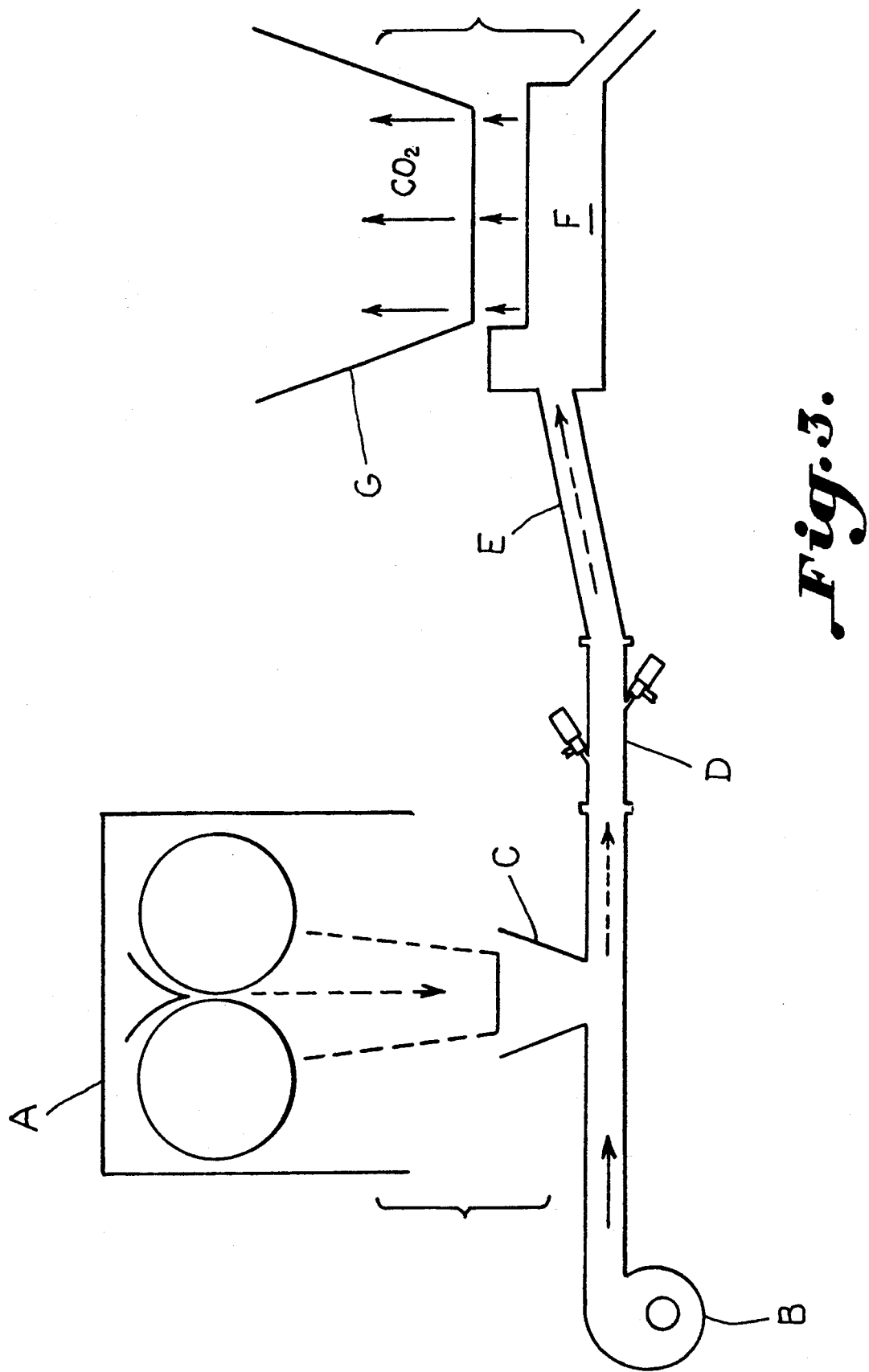
FIG. 3 is a schematic view illustrating the sequential stages of the cooling of newly-formed soft elastic gelatin capsules in accordance with an alternate embodiment of the process of the present invention.

Another cooling method contemplates direct heat exchange with solid carbon dioxide. Carbon dioxide or other gases converted to solid $CO_2$ mist by the mixture of liquid and gaseous forms can achieve ultimate capsule cooling. FIG. 3 illustrates the progression of soft elastic gelatin capsules through a $CO_2$ cooling system. Vitamin E capsules are taken as an illustrative example. In this embodiment, forming dies A enclose the vitamin E oil in a gelatin sheath. The formed capsules drop into a cup C and then enter a pneumatic transport driven by a suitable blower B. At point C, the capsule input temperature is about 75° F. (23.8° C.). The capsules are conveyed to a section D, into which the liquid-gas carbon dioxide mixture is introduced (see FIG. 6). The pipe temperature of section D is approximately $-100°$ F. ($-87.6°$ C.). The capsules are further conveyed to a pipe E, which has a temperature of about $-70°$ F. ($-70.9°$ C.). Once the capsules exit piping E and are deposited onto a suitable conveyor F, the capsules are at a temperature of approximately 45° F. (7.2° C.), which is considered the optimum output temperature for vitamin E capsules. This cooling method can reduce capsule temperature from 70°-95° F. (21.1°-35.0° C.) to 35°-45° F. (1.6°-7.2° C.) over a time of less than two seconds. A ventilation duct G may be disposed above the conveyor F to remove excess carbon dioxide. Experimental results have indicated that temperature in the vent G is about 30° F. (1.1° C.), indicating that most of the carbon dioxide is utilized for the purpose of capsule heat reduction.

Jacketed coolant systems are efficient and can accomplish soft elastic gelatin cooling properties through indirect heat exchange with $CO_2$ mist. Specifically, the section D pipe may be enclosed within a jacket, and $CO_2$ mist may be introduced into the annular space between section D and the jacket. The mist would cool the section D pipe, which, in turn, would cool the capsules passing therethrough.

Regardless of the cooling method used, capsules should be cooled sufficiently to prevent sticking but not excessively so as to offset capsule shock or possible distortion and quick contraction. Some typical examples of desirable capsule cooling in accordance with the process of the present invention are:

(a) Input temperature after capsule formation 75° F. (23.8° C.). Output temperature after cooling of the capsules 45° F. (7.2° C.).
(b) Input temperature after capsule formation 90° F. (32.2° C.). Output temperature after cooling of the capsules 40° F. (4.4° C.).
(c) Input temperature after capsule formation 80° F. (26.7° C.). Output temperature after cooling of the capsules 35° F. (1.6° C.).
(d) Input temperature after capsule formation 65° F. (18.3° C.). Output temperature after cooling of the capsules 50° F. (10.0° C.).
(e) Input temperature after capsule formation 0° F. (−17.8° C.). Output temperature after cooling of the capsule −50° F. (−59.8° C.).

Figure 4:
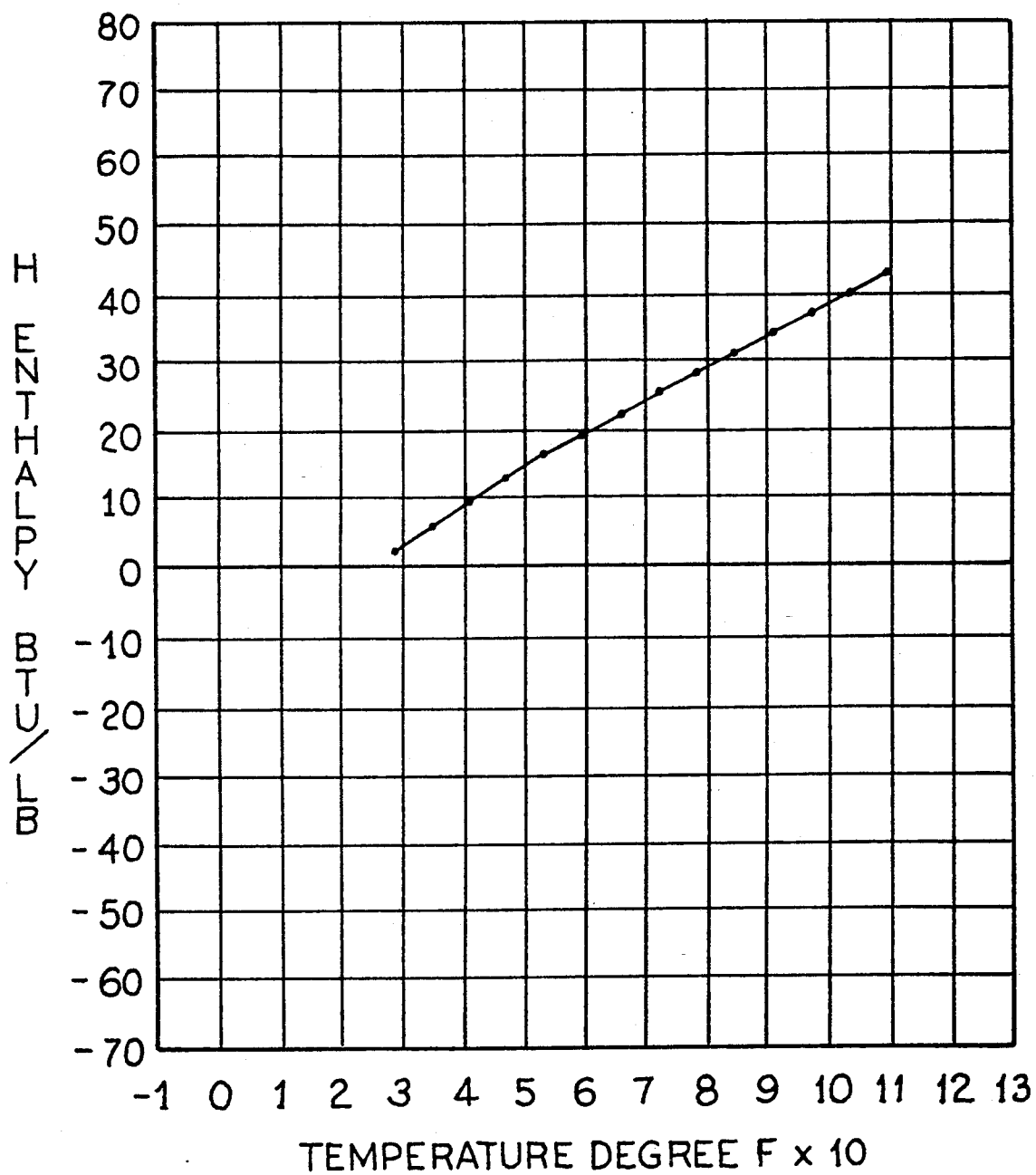
FIG. 4 is a plot of enthalpy versus temperature of a soft elastic gelatin capsule.

Thermal heat transfer studies have indicated that 15-20 British Thermal Units/lb. of cooling are required to sufficiently cool capsules This figure has been derived from the plot of enthalpy versus temperature of a soft elastic gelatin capsule, illustrated in FIG. 4. For a preferred drop in capsule temperature, for example, from 75° F. to 45° F., the corresponding change in enthalpy is approximately 15 Btu/lb. The process of the present invention therefore contemplates cooling a capsule surface for a time sufficient to remove about 10–20 Btu/lb. from a capsule ranging from as small as #1 oval to as large as #20 oblong.

These Examples should not be thought of as being the only ranges of temperature within the scope of this invention. Temperatures above or below the inputs and outputs can be construed to be included in the operational range of this invention.

For further example in the case of lecithin oil capsules, input temperature after formation of the sealed soft elastic gelatin capsule is about 85° F. (29.5° C.). Sufficient cooling is utilized to reduce the capsule temperature to about 45° F. (7.2° C.). Once established, this temperature deflection can be keyed into a thermocouple, which regulates the necessary and required cooling capacity. Lecithin capsules which are #20 oblong in dimension are somewhat representative of a large gelatin capsule. Other products which can be encapsulated include paste products such as drugs, amino acids, fish oils, plant oils, fragrances, and medications for internal or external application.

The preferred cooling system is one which can be easily controlled as to the degree of temperature imparted to the capsules while the preferred fibers used to remove oil and extraneous matter from capsule surfaces are those which can be recycled numerous times and which have a large affinity for oils. A typical, preferred cooling and oil removal process has the following specifications.

| Input Temperature | 70–95° F. (21.1–35.0° C.) |
| --- | --- |
| Retention time during cooling | Sufficient for capsule surfaces to chill from input temperature to 35–45° F. (1.6–7.2° C.). |
| Contact time during oil removal | Dependent upon volumes of oil being left on the capsules. The number of oil absorbent cloths can be determined by the cleanliness of the capsules. |

Figure 5:
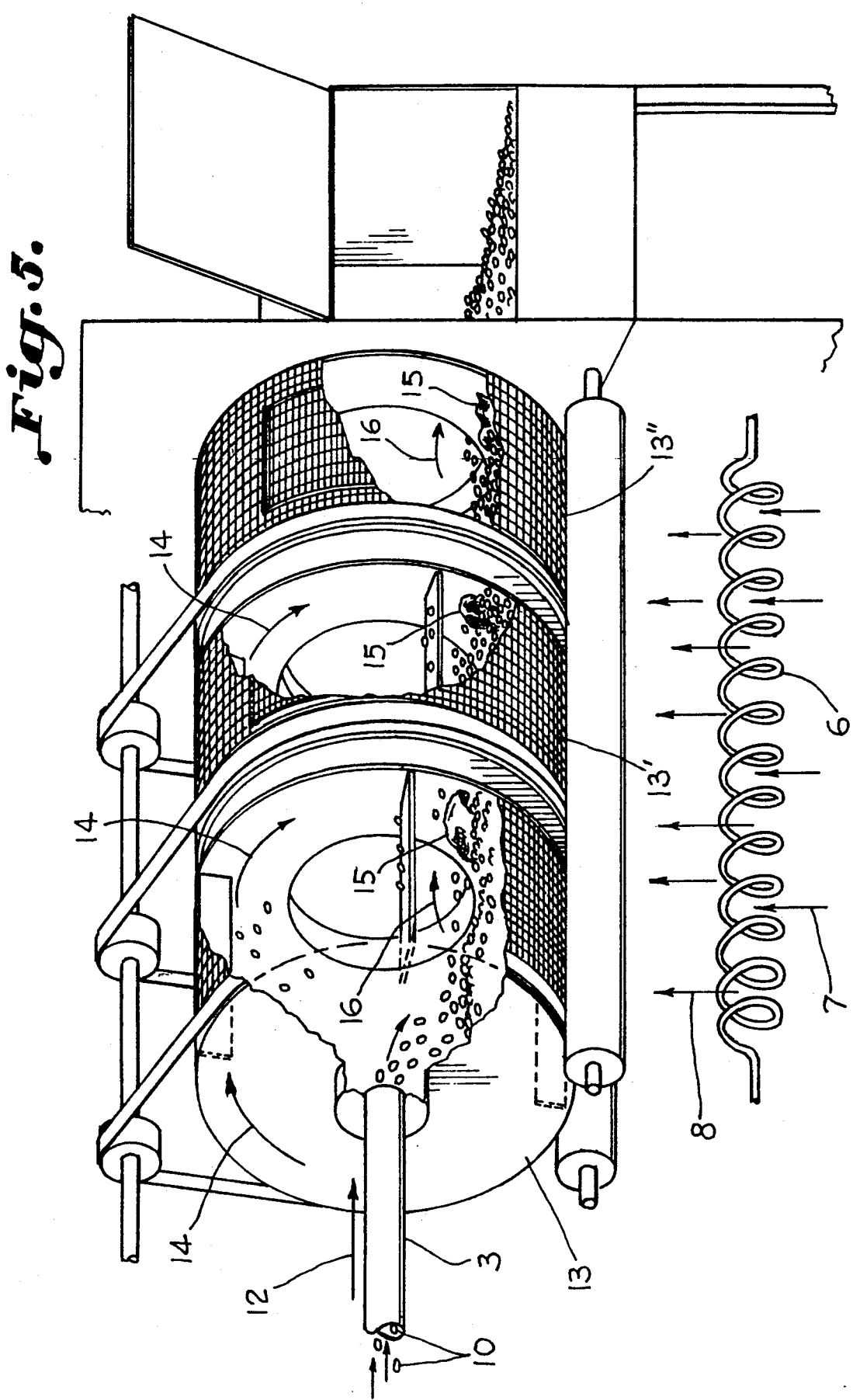
FIG. 5 is a perspective view, shown partially in section, detailing the rotating tumbling means shown in FIG. 2 and illustrating the progressive physical removal of oil from soft elastic gelatin capsules as the capsules are deposited sequentially into a plurality of rotating baskets and then into a collection chamber.

The physical removal of oils is preferably accomplished by placing the capsules within the rotating baskets previously described in connection with use of the cathebar air cooling system. Referring to FIG. 5, oily capsules 10 pass through a suitable conveyor 3 in the direction shown by arrow 12 and are deposited into a basket 13 rotating in a direction such as indicated by arrows 14. In this particular variation of the process of the present invention, the capsules intermingle with oil absorbent cloths 15 for preliminary physical removal of oil. The rotating baskets may alternatively be lined with oil-absorbent material instead of containing oil absorbent cloths. Capsules remain in basket 13 until they are displaced by the influx of additional capsules from conveyor 3. The displaced capsules flow in the direction shown by arrow 16 into another rotating basket 13' adjacent to basket 13. There the capsules undergo further physical removal of oil by oil absorbent cloths 15 until displacement into rotating basket 13", where still further physical removal of oil occurs. Displacement of capsules from one rotating basket to another may be promoted by progressively declining the elevation of each basket, here from the left to the right of FIG. 5. When the capsules are thereafter displaced into a collection chamber 17, they are oil free and are ready for drying. This preferred method of oil removal, when combined with the introduction of cool cathebar air, reduces treatment time of newly-formed capsules from the conventional 3–4 hours to approximately 30–45 minutes. Moreover, this method saves a considerable amount of space required for treatment of newly-formed capsules when compared to conventional methods. For instance, only three rotating baskets and a collection chamber are required for this embodiment, as compared with thirteen rotating baskets and two solvent washers for a conventional process.

It has been found that cooling can prevent sticking of capsules. Where carbon dioxide mist was applied directly onto conveyed pre-formed soft elastic gelatin capsules as described in the above text referring to FIG. 3, the capsules became cool sufficiently so as not to stick together and were further conveyed to rotating baskets. In the baskets were cloths made of oil absorbent modified polyester. The capsules rolled with the cloths for a sufficient time to allow for oil removal. In some cases oil was picked up satisfactorily within five to twenty minutes. Times varied depending on oil quantities.

Another application involved the movement of soft elastic gelatin capsules from the point of formation to a static bed refrigerator. Less than sixty (60) second retention at 33°–50° F. (0.6°–10.0° C.), preferably 40° F. (4.4° C.), accomplishes the task of preventing capsule-to-capsule sticking. The capsules were then placed on trays lined with oil absorbent fabric.

Cooling of the capsules can take place at the same time the oil is being removed. In addition to the preferred process method (FIGS. 1, 2, and 5), such an operation may comprise rotating baskets, such as those illustrated in FIGS. 2 and 5, which are exposed to solid $CO_2$ mist in a manner similar to section D of the apparatus illustrated in FIG. 3. The capsules would therefore undergo indirect heat exchange with solid carbon dioxide while undergoing physical removal of oil. This particular operation can reduce the capsule input temperature by 30°–40° F. over a time of no more than 30 seconds.

Finally, it is to be understood that for certain type capsules the process of the present invention may comprise the single step of physically removing the oil and other matter from the capsules. For example, a series of rotating baskets may be used to remove oils from the capsules without a cooling means, although minor sticking tendencies would appear in the capsules at early stages of oil removal.

It is therefore seen that cooling of the capsule can be direct or indirect, and oil removal can be accomplished by using loose fibers, intact cloth, absorbent cellulose, absorbent paper and other man-made or synthetic materials which have affinity for oil. The conditions of oil absorption control the reusability of the absorptive material and duration of use. Reusable fibers are available which can be washed and repeatedly applied. Disposable materials are also commercially available. The choice depends on the user's interest and facilities.

BEST MODE FOR CARRYING OUT THE INVENTION

In order that those skilled in the art may be better enabled to practice the present invention, the following examples are given by way of illustration and not by way of limitation.

EXAMPLE 1

Figure 6:
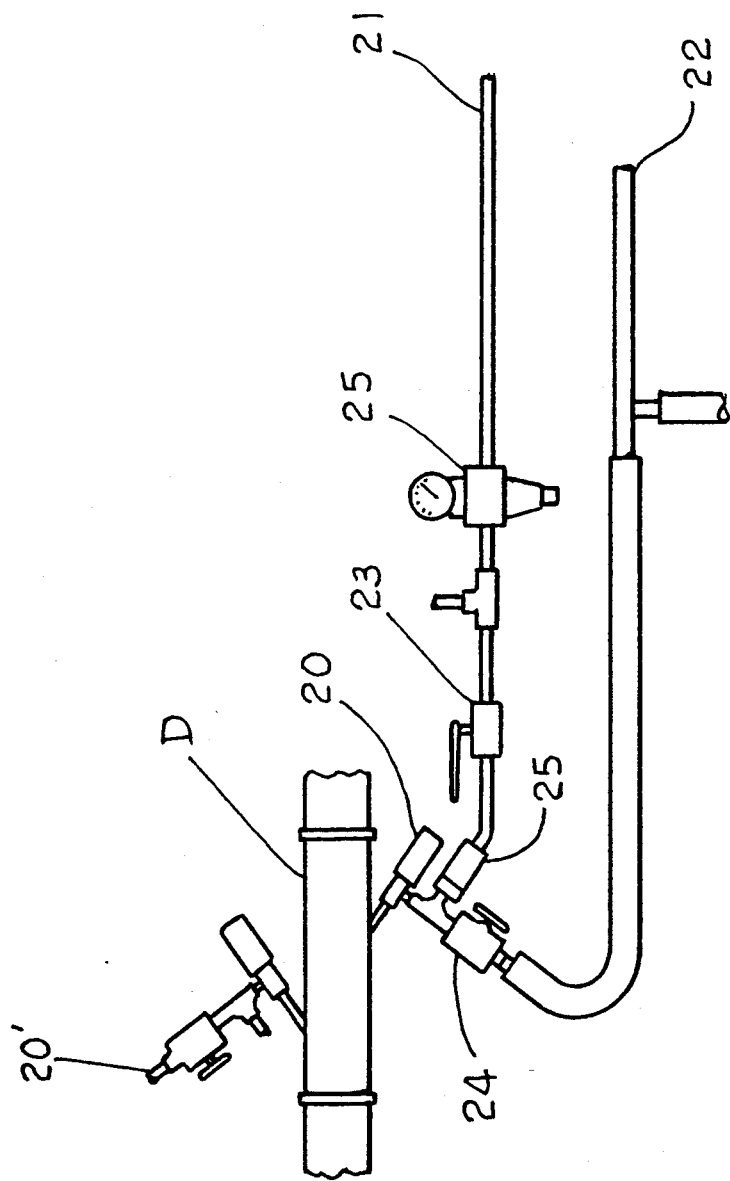
FIG. 6 is a schematic view detailing section D of FIG. 3, into which carbon dioxide, both in liquid and in gaseous forms, is introduced to cool soft elastic gelatin capsules.

A formed capsule was delivered directly to a pneumatic transfer conveyer equipped with a blower sufficiently capable of moving capsules along a 12 foot length. Referring to FIG. 6, a Praso valve feeds a mist of carbon dioxide onto the capsules at section D (from FIG. 1), after the point at which capsules are picked up by the pneumatic transport. It is important that the carbon dioxide be created by an admixture of liquid and gaseous forms of carbon dioxide. The gaseous and liquid forms of carbon dioxide are fed to Praso valve 20 through respective conduits 21 and 22. The amount of gaseous and liquid carbon dioxide flowing to Praso valve 20 is controlled by respective suitable valves 23 and 24. The combination results in a solid which can be controlled in terms of particle size by a Praso valve regulator 25. An identical arrangement to that described above may be used to inject additional carbon dioxide admixture into section D, as indicated at 20'. Although transport time is less than one second, capsule temperature drops from a formation temperature of about 85° F. (29.5° C.) to one of 45° F. (7.2° C.) after conveyance. Capsule output can range from less than one thousand to over three thousand capsules per minute. The capsules are transported to rotating baskets which contain oil absorbent cloth in a size that agrees with manufacturing parameters. They are retained in such baskets until sufficient oil, pastes, and/or solid particles have been removed. The capsules are then dried; for example, they are placed on paper-lined trays and are further processed by drying and inspection.

The drying and inspection, a necessary step in the total manufacturing process, may constitute additional steps of the process of the present invention. One drying method, for example, contemplates maintaining capsules at a low-humidity condition in a chamber with forced air circulation to allow for uniform drying. The chamber may be rotating or static, and the volume of forced air may vary. It has been suggested that drying time may in some cases be accelerated by cooling the capsules through the various methods described herein. Typically, soft elastic gelatin capsules require static bed drying for 12 to 16 hours. Using the process of the present invention, capsules can dry in less than 4 hours, although certain other types of capsules may take several days to fully dry. Oil absorbent material can be additionally implemented to further remove matter from the capsules after the drying and inspection thereof.

EXAMPLE 2

In a manner similar to that described in Example 1, except that pneumatic transport was not used, capsules were cooled using dry ice to cool a rolling conveyor onto which capsules were placed. The same results were obtained.

EXAMPLE 3

In a manner similar to that described in Example 1, the same cooling of capsules was done except that capsules were placed directly onto trays lined with oil absorptive cloth. The same results were obtained.

EXAMPLE 4

In a manner similar to that described in Example 1, cooling of capsules was done such that capsule temperature drop was from 85° F. (29.5° C.) to 60° F. (15.6° C.). The process yielded the same results.

EXAMPLE 5

In a manner similar to that described in Example 1, cooling of capsules was done such that capsule temperature drop was from 85° F. (29.5° C.) to 33° F. (0.6° C.). The process yielded the same results.

EXAMPLE 6

In a manner similar to that described in Example 1, oil removal was accomplished by the use of only one cloth, and observed oil and surface material was deemed removed as was with three cloths.

EXAMPLE 7

Physical removal of oil and other matter from the capsules was done in a manner similar to that described in Example 1, but cooling was accomplished through direct heat exchange with cathebar air as per the preferred embodiment. Capsules were successfully processed with only minor sticking tendencies.

Physical removal of matter, particularly oils, from the capsules can be additionally accomplished by tumbling or rolling the capsules on a bed of oil-absorbent material, or by placing them on a static bed of the same material.

The above examples show that the Soft Elastic, Gelatin Capsule Solvent Elimination Process performed according to the present invention can be applied under a wide variety of conditions. In general, the process can be incorporated with any active or inactive medicinal or food nutrient, cosmetic, novelty or toiletry product.

RESULTANT CAPSULES

The soft elastic gelatin capsules produced according to the process of the present invention using various methods as illustrated above were subjected to stability studies and transportation tests after storage. The resultant capsules were bulk packaged and stored in a warehouse environment for several weeks. A bulk packed box of these capsules was shipped under separate cover of a bulk box of soft elastic gelatin capsules produced using the conventional manufacturing process, i.e., a solvent wash. The land and air shipment did not undergo any special handling instructions and was subjected to high heat and humidity conditions by movement to and from South Florida. The returned capsules were examined by a Quality Control specialist and by manufacturing heads. The capsules that underwent the inventive process were free flowing and oil free. Those capsules that went through a solvent wash, however, were clumped and tended to stick to one another.

While a preferred embodiment of the invention has been described using specific terms, such description is for illustrative purposes only, and it is to be understood that changes and variations may be made without departing from the spirit or scope of the following claims.

What is claimed is:

1. A process for treating newly formed soft elastic gelatin capsules to avoid their sticking to one another and to remove matter in the form of oils, pastes, and solid particles from exterior surfaces of said capsules, comprising the steps of:
   cooling said capsules to aid in preventing capsule deformation and to aid in removing aqueous moisture from exterior surfaces of said capsules; and
   contacting said capsules with an absorbent material to remove said oils, pastes, and solid particles from said exterior surfaces of said capsules.

2. The process set forth in claim 1 wherein said absorbent material is modified polyester cloth.

3. The process set forth in claim 1 wherein cooling is accomplished by direct heat exchange with solid carbon dioxide.

4. The process set forth in claim 3 wherein said cooling of said newly formed soft elastic gelatin capsules reduces temperature thereof from 80°–90° F. (26.7°–32.2° C.) to 33°–60° F. (0.6°–15.6° C.) over a time of less than one second.

5. The process set forth in claim 1 wherein cooling is accomplished by indirect heat exchange with solid carbon dioxide.

6. The process set forth in claim 5 wherein said cooling of said newly formed soft elastic gelatin capsules reduces temperature thereof from 80°–90° F. (26.7°–32.2° C.) to 33°–60° F. (0.6°–15.6° C.) over a time of less than one second.

7. The process set forth in claim 1 wherein cooling is accomplished by direct heat exchange with cathebar air.

8. The process set forth in claim 7 wherein said cooling of said newly formed soft elastic gelatin capsules reduces temperature thereof by a magnitude of 30°–40° F.

9. The process of claim 1 wherein cooling is accomplished by using a static bed refrigerator.

10. The process of claim 9 wherein said newly formed soft elastic gelatin capsules are retained in said static bed refrigerator at 33°–50° F. (0.6°–10.0° C.) over a time of less than 60 seconds.

11. The process set forth in claim 1 wherein said newly formed soft elastic gelatin capsules are contacted by said absorbent material in a rotating tumbling means.

12. The process set forth in claim 11 wherein said rotating tumbling means is a plurality of rotating baskets, each of said baskets containing at least one cloth of oil-absorbent material for intermingling with said newly formed soft elastic gelatin capsules.

13. The process set forth in claim 11 wherein said rotating tumbling means is a rotating basket lined with said absorbent material.

14. The process set forth in claim 1 wherein said newly formed soft elastic gelatin capsules are tumbled on a bed of said absorbent material for removing said matter from exterior surfaces of said capsules.

15. The process set forth in claim 1 wherein said newly formed soft elastic gelatin capsules are placed onto a static bed of said absorbent material for removing said matter from exterior surfaces of said capsules.

16. The process set forth in claim 1 wherein said newly formed soft elastic gelatin capsules are simultaneously cooled and contacted with absorbent material.

17. The process set forth in claim 16 wherein said newly formed soft elastic gelatin capsules are intermingled with said absorbent material within a rotating tumbling means while undergoing indirect heat exchange with solid carbon dioxide 18. The process set forth in claim 17 wherein said cooling of said newly formed soft elastic gelatin capsules reduces temperature thereof by a magnitude of 30°–40° F. over a time of no more than 30 seconds.

19. The process set forth in claim 16 wherein said newly formed soft elastic gelatin capsules are intermingled with said absorbent material within a rotating tumbling means while undergoing direct heat exchange with cool cathebar air.

20. The process set forth in claim 19 wherein said cooling of said newly formed soft elastic gelatin capsules reduces temperature thereof by a magnitude of 30°–40° F.

21. The process set forth in claim 20 wherein said absorbent material is modified polyester cloth.

22. Soft elastic gelatin capsules, prepared by the process of claim 19.

23. The process set forth in claim 1 wherein said newly formed soft elastic gelatin capsules are cooled form 70°–95° F. (21.1°–35.0° C.) to 35°–45° F. (1.6°–7.2° C.) over a time of less than two seconds by indirect heat exchange with carbon dioxide mist and contacted with said absorbent material in a rotating tumbling means.

24. The process set forth in claim 23 wherein said absorbent material is modified polyester cloth.

25. Soft elastic gelatin capsules, prepared by the process of claim 23.

26. The process set forth in claim 1 including the further steps of drying and inspecting the thus-produced capsules.

27. The process set forth in claim 26 wherein said capsules are dried after about 4 hours.

28. The process of claim 1, wherein the surfaces of the capsules are cooled so as to remove about 15–20 Btu/lb. from a capsule ranging from as small as #1 oval to as large as #20 oblong.

29. Soft elastic gelatin capsules, prepared by the process of claim 1.

30. A process for treating newly formed soft elastic gelatin capsules to avoid their sticking to one another and to remove matter in the form of oils, pastes, and solid particles from exterior surfaces of said capsules, comprising the steps of:
   cooling said capsules to aid in preventing capsule deformation and to aid in removing aqueous moisture from exterior surfaces of said capsules; and
   removing said oils, pastes, and solid particles from the exterior surfaces of said capsules.

31. Soft elastic gelatin capsules, prepared by the process of claim 30.

32. The process set forth in claim 30, wherein the removing of matter in the form of oils, pastes, and solid particles from the exterior surfaces of said capsules is accomplished by absorbing said matter from said exterior surfaces.

* * * * *